(12) United States Patent
Olson, Jr.

(10) Patent No.: US 7,438,341 B1
(45) Date of Patent: Oct. 21, 2008

(54) HEADLINER RETAINER

(75) Inventor: Ano H. Olson, Jr., Ortonville, MI (US)

(73) Assignee: Fourslides Inc., Madison Heights, MI (US)

( * ) Notice: Subject to any disclaimer, the term of this patent is extended or adjusted under 35 U.S.C. 154(b) by 0 days.

(21) Appl. No.: 11/701,861

(22) Filed: Feb. 2, 2007

(51) Int. Cl.
*B60J 3/00* (2006.01)

(52) U.S. Cl. .................. 296/97.9; 296/214; 248/231.81

(58) Field of Classification Search .............. 296/97.9, 296/214, 39.1; 248/231.81
See application file for complete search history.

(56) References Cited

U.S. PATENT DOCUMENTS 6,068,323 A * 5/2000 Brown et al. ............... 296/97.9

6,863,331 B2 * 3/2005 Beaver et al. .............. 296/97.9

* cited by examiner

*Primary Examiner*—Joseph D Pape
(74) *Attorney, Agent, or Firm*—Renner, Kenner, Greive, Bobak, Taylor & Weber

(57) ABSTRACT

A visor support assembly mountable to a vehicle having a headliner and adapted to secure a portion of a sun-visor includes a support adapted to securely receive the portion of the sun-visor. The support includes a surface which engages the headliner and an insert which projects through a hole in the headliner. A retainer includes a generally flat body and an aperture sized to fit around the insert. The retainer may further include a plurality of tabs extending inwardly from the body. The tabs engage the insert holding the headliner securely between said surface and said retainer body.

17 Claims, 5 Drawing Sheets

HEADLINER RETAINER

TECHNICAL FIELD

The present invention relates to retainer clips. More particularly, this invention relates to retainer clips adapted for use with vehicle headliners, which hold the vehicle headliner flush against various objects within the vehicle's interior. More specifically, this invention relates to retainer clips which hold vehicle headliners flush with visor supports.

BACKGROUND ART

In the automobile industry, it is desirous to maintain tight tolerances and provide a vehicle wherein each element appears to fit perfectly. Even slight errors in manufacturing can lead result in a disfavorable impression of the vehicle by the prospective buyer. Thus, attention to detail is of utmost importance, particularly within the interior of the vehicle.

Vehicle manufacturers use headliners on the interior roof of cars and trucks to provide decorative, safety, and noise damping functions. A number of components extend through the headliner and are secured to the vehicle frame such as sun visor supports and the like. These components project through a hole in the headliner and are secured within a corresponding recess within the vehicle frame. When engineered and manufactured perfectly, the components fit snugly within the vehicle frame recess and correspondingly hold the headliner snugly between it and the vehicle frame. It has been found, however, that oftentimes it is difficult to perfectly manufacture the interior component or the vehicle frame, so that when the interior component is installed, an inordinately large gap is formed between the vehicle frame and the component. This gap enables the headliner to shift up or down and provides a disfavorable visual impression which might dissuade a consumer from purchasing the car.

Thus, there exists a need in the art for a means to maintain a vehicle headliner firmly against an interior component.

DISCLOSURE OF THE INVENTION

Therefore, it is an object of the present invention to provide a retainer which holds a headliner securely to a visor support.

It is still another object of the present invention to provide a retainer which is easily installed.

These and other objects of the present invention, as well as the advantages thereof over existing prior art forms, which will become apparent from the description to follow, are accomplished by the improvements hereinafter described and claimed.

In general, a visor support assembly includes a support adapted to securely receive a portion of a sun-visor. The support includes a surface which engages the headliner and an insert which projects through a hole in the headliner. A retainer includes a generally flat body, an aperture sized to fit around the insert, and a plurality of tabs extending inwardly from the body. The tabs engage the insert holding the headliner securely between the surface and the retainer body.

In another embodiment, an interior support assembly is adapted to extend through a vehicle headliner and mount to a vehicle frame. The support assembly includes a support including a surface coplanar with, and adapted to lie flush with, the headliner. An insert extends upwardly from the surface and has a smaller circumference than the surface. The insert is received through a hole in the headliner. A retainer has an aperture to receive the insert, and the headliner in secured between the surface and the retainer.

According to another embodiment, a method of securing a support to a headliner includes the steps of; providing a support including an exterior wall adapted to carry an object within a vehicle interior, an insert adapted to extend through a hole in the headliner and a surface generally coplanar to the headliner; inserting the insert into the hole in the headliner; and pressing a retainer having tabs onto the insert thereby engaging the insert with the tabs and securing the headliner between the surface and the retainer.

A preferred exemplary headliner retainer clip according to the concepts of the present invention is shown by way of example in the accompanying drawings without attempting to show all the various forms and modifications in which the invention might be embodied, the invention being measured by the appended claims and not by the details of the specification.

BEST MODE FOR CARRYING OUT THE INVENTION

A headliner retainer of the present invention is used in conjunction with a visor support generally indicated by the numeral 10. Visor support 10 is provided to selectively secure a portion of a sun-visor used in passenger vehicles. Typically, passenger vehicle sun-visors are pivotally mounted at a first end, and the opposed end is selectively received by the visor support 10. Once secured thereto, the visor support 10 maintains the sun-visor, preventing unwanted pivotal movement. It should be appreciated that, while the description herein prefers only to visor supports, the retainer of the present invention may be used in conjunction with other interior components, such as visor pivots, consoles, coat hooks, lights and the like.

Figure 1:
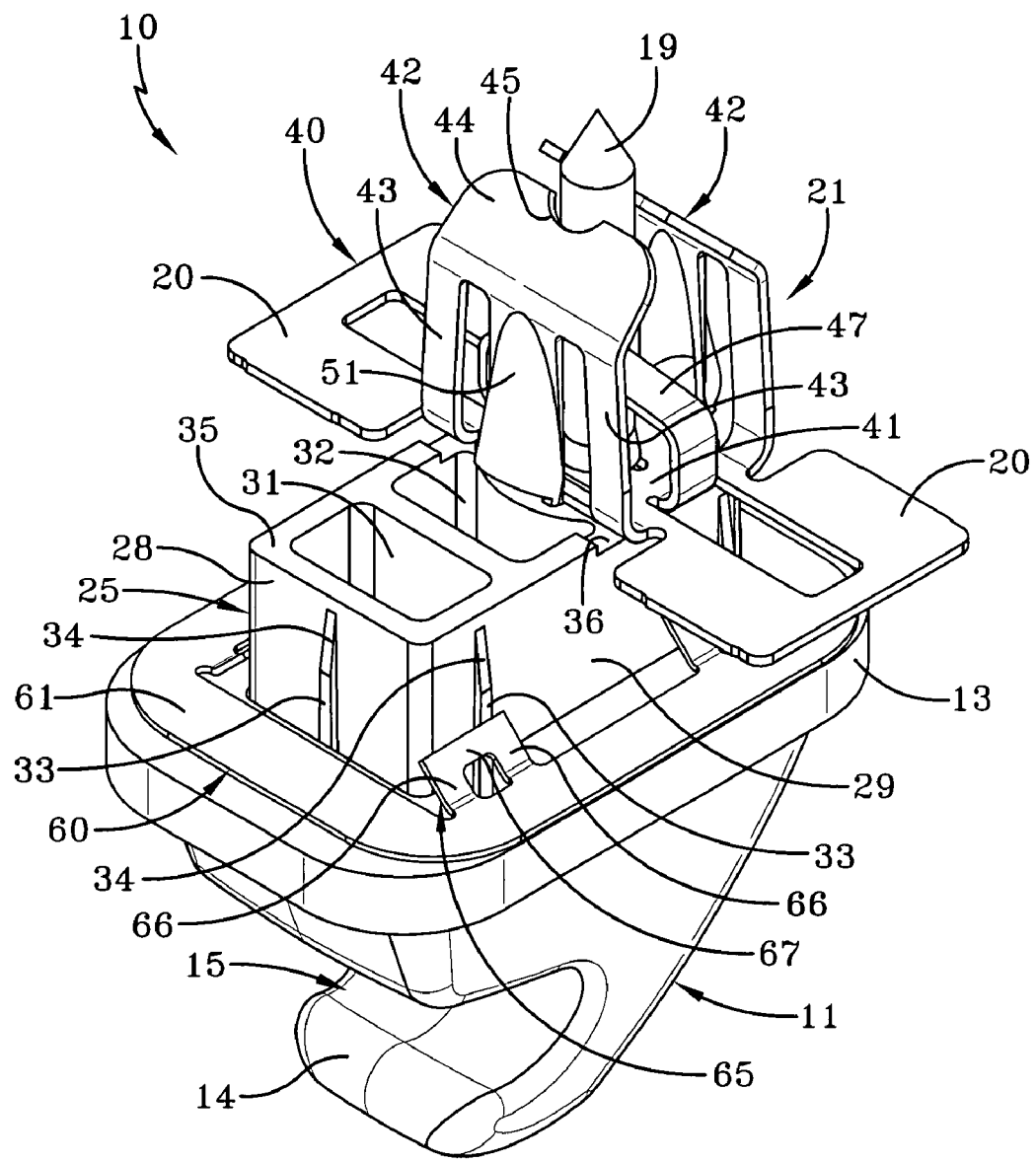
FIG. 1 is a perspective view of a visor support assembly having the retainer clip of the present invention.
Figure 1A:
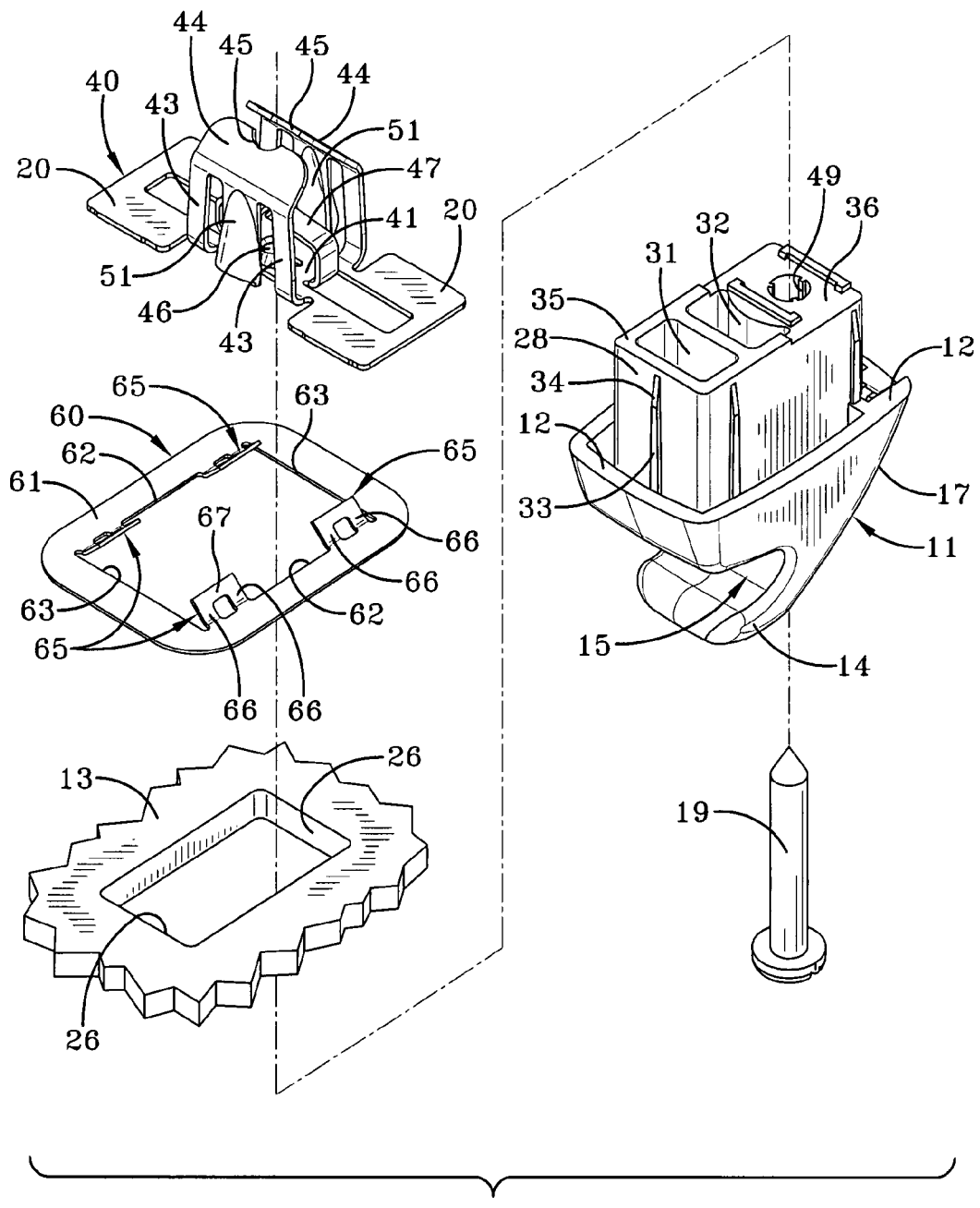
Figure 2:
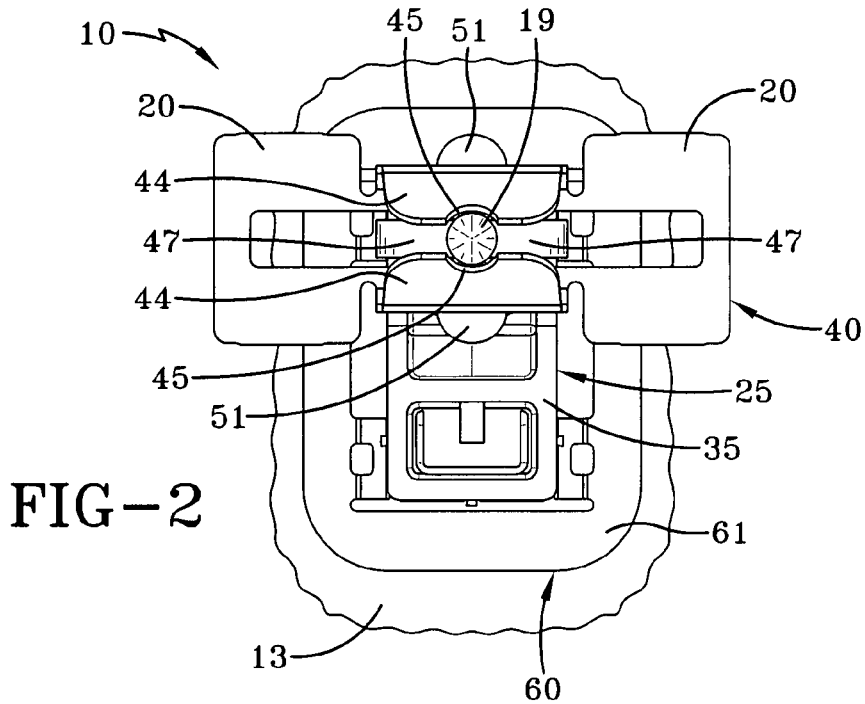
FIG. 2 is a top plan view of the visor support assembly of FIG. 1.
Figure 3:
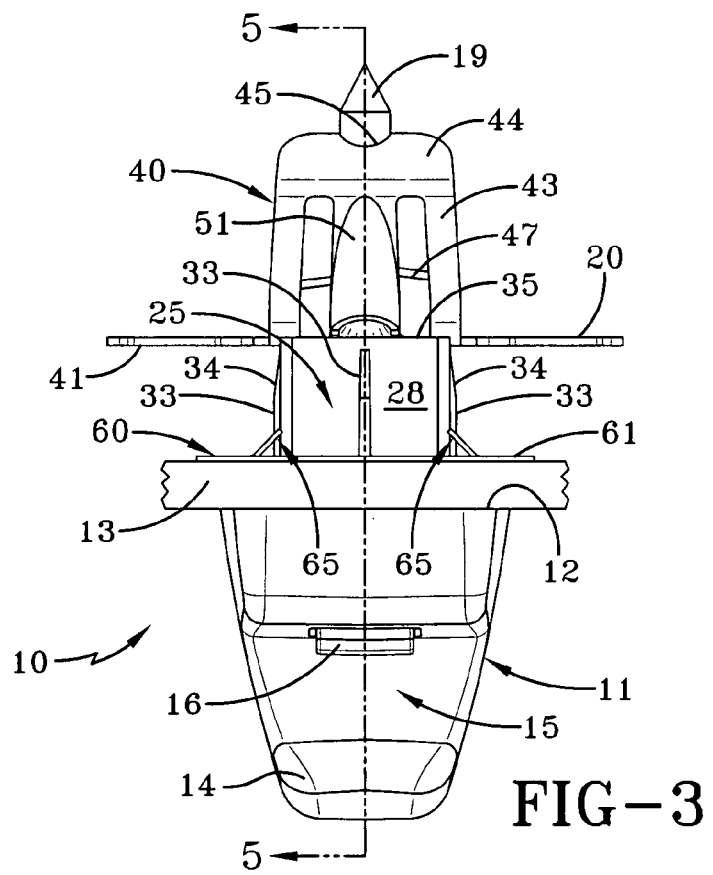
FIG. 3 is a front elevational view of the visor support assembly of FIG. 1.
Figure 5:
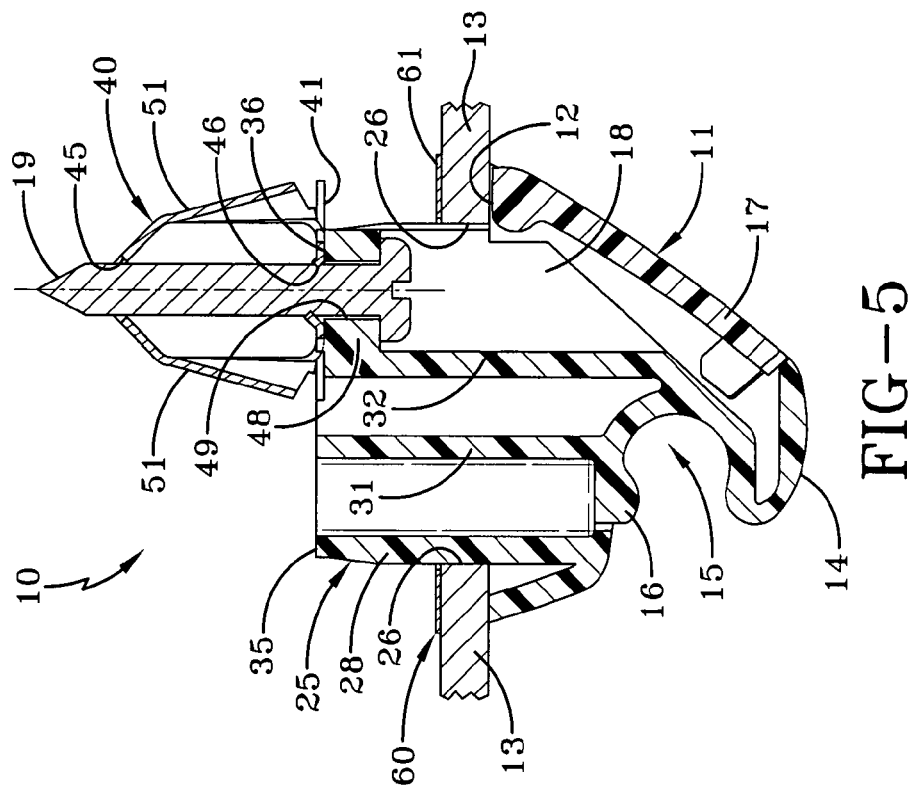
FIG. 5 is a sectional view taken substantially along line 5-5 of FIG. 3.
Figure 4:
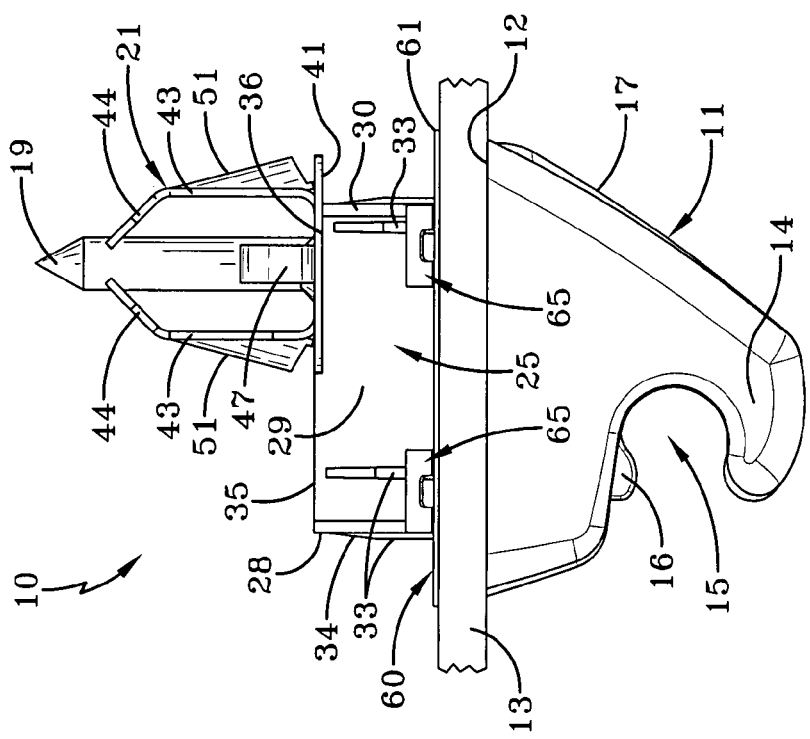
FIG. 4 is a side elevational view of the visor support assembly of FIG. 1.

With reference to FIGS. 1-5, visor support 10 includes an exterior wall 11, when assembled, which is the visible portion of visor support 10. Exterior wall 11 defines a headliner mount surface 12 which, when assembled, is positioned securely against a vehicle headliner 13. As is known in the art, vehicle headliners 13 are disposed on the interior of a vehicle frame (not shown) and provide decorative, noise damping and safety functions. Exterior wall 11 includes a hook portion 14 at the bottom extremity thereof. Hook portion 14 provides a recess 15 which is adapted to receive a portion of a sun-visor (not shown) therein. In order to selectively secure the sun-visor within recess 15, a tongue 16 may be provided which protrudes slightly into recess 15. As shown in FIGS. 3-5, tongue 16 may be secured at one end to exterior wall 11 in a cantilever fashion. Tongue 16 is a resilient member, enabling the user to easily insert and remove the sun-visor into recess 15, while providing a securing function to maintain the sun-visor in recess 15. Visor support 10 further includes a cover 17 which is pivotally attached to exterior wall 11 at a location proximate to headliner 12. Cover 17 may be selectively opened to expose an interior cavity 18. As will be hereinafter described, interior cavity 18 is provided to receive a screw 19 therein.

Visor support 10 includes an insert 25 which extends upwardly beyond exterior wall 11 in the direction opposed from hook 14. The outer periphery of insert 25 is smaller than that of headliner mount surface 12 and is adapted to extend through a hole 26 in headliner 13. Insert 25 is further adapted to fit within a recessed portion of a vehicle frame (not shown) for attachment thereto. Insert 25 may include a front wall 28, a pair of side walls 29, and a rear wall 30 which generally defines the exterior profile of insert 25. In one or more embodiments, insert 25 may be generally rectangular, square, circular or oval. Insert 25 may further include a first and second interior wall 31 and 32 which are generally parallel to and spaced from front wall 28 and provide structural support. First and second interior walls 31 and 32 extend between, and connect to, side walls 29. One or more ribs 33 may be provided on side walls 29 and/or front wall 28. Ribs 33 extend upwardly along the respective walls from headliner mount surface 12 toward the opposed ends of walls 28 and 29. As seen in FIGS. 3 and 4, ribs 33 may terminate prior to the ends of walls 28 and 29. Further, ribs 33 may include a sloped portion 34 at the upper extremity thereof, which provides a gradual decrease in the thickness of ribs 33. In the embodiment disclosed herein, two ribs are provided on each side, but it should be appreciated that any number of ribs may be provided on side walls 29 or front wall 28.

Walls 28-30 form a stepped top surface including a first step surface 35 and a second step surface 36. First step surface 35 is formed from the upper ends of front wall 28, side walls 29 and first interior wall 31. Second step surface 36 is formed from the upper ends of side walls 29 and rear wall 30. A clip generally indicated by the numeral 40 is provided and coupled to the upper end of insert 25 at second step surface 36. Clip 40 is adapted to secure visor support 10 to the vehicle frame. It should be appreciated that any type of clip may be used while practicing the present invention, and therefore only general reference will be made to particular clip features. Clip 40 may include a flattened base 41, a portion of which rests flush against second step surface 36. As shown in FIGS. 4 and 5, flattened base portion 41 may have a thickness which brings it co-planar with first step surface 35. A pair of tabs 42 extend upwardly from base 41, each of which include a pair of flat legs 43 which terminate at a lip 44. Lips 44 are disposed at an angle relative to legs 43. Each lip 44 may include a notch 45, located at a central location on the upper edge thereof. Notches 45 are adapted to provide clearance for screw 19.

Clip 40 includes a central aperture 46 on base 41 which is adapted to engage and receive screw 19 therethrough. Further, a pair of engaging members 47 may extend upwardly and inwardly from base 41 to engage screw 19. In this manner, clip 40 receives and engages screw 19. Specifically, the threads of screw 19 engage aperture 46 and engaging members 47 as screw 19 is rotated during assembly. When assembled, screw 19 is received within interior cavity 18 which is defined by second interior wall 32, side walls 29, rear wall 30 and a bottom wall 48 proximate to second step surface 36. Bottom wall 48 includes a central hole 49 which is adapted to receive screw 19 therethrough. As shown in FIG. 5, screw 19 is received through hole 49, aperture 46 and contacts engaging members 47. In this manner screw 19 secures clip 40 to visor support 10.

Clip 40 is adapted to secure visor support 10 to the vehicle frame. Consequently, tabs 42 each include a retaining member 51. Retaining members 51 extend downwardly from lip 44 and are positioned between legs 43. As shown best in FIGS. 1 and 4, each retaining member 51 is disposed at an angle relative to legs 43. In other words, retaining members 51 are angled to extend outwardly beyond legs 43. In one or more embodiments retaining members 51 may include a partial conical shape which improves strength. Further, because of the cantilever arrangement, retaining members 51 are resiliently movable. That is, they are capable of flexing inwardly and deflecting about the joint with lip 44.

Visor support 10, clip 40 and headliner 13 may be preassembled prior to installation in a vehicle. Insert 25 may be inserted through hole 26 in headliner 13. Clip 40 may then be secured to support 10 via screw 19. Insert 25 and clip 40 may then be inserted into a recess in the vehicle body. Clip 40, and specifically tabs 42, are received within a retaining hole within the vehicle body recess. In a manner known in the art, retaining members are pushed inward, and then engage the retaining hole, thereby securing the assembly to the vehicle body. Ideally, the vehicle body recess and the insert are sized so that upon insertion into the vehicle body, headliner mount surface 12 holds headliner 13 firmly against the vehicle frame. However, in some instances, either the vehicle body recess is too shallow, or insert 25 is too long. In such cases, the space between headliner mount surface 12 and the vehicle body is too large, and headliner 13 is not maintained flush against headliner mount surface 12. In this condition headliner 13 may be pushed upwardly, exposing insert 25 and generally providing a loose or sloppy fit. This problem is alleviated by the retainer of the present invention, generally indicated by the numeral 60.

Figure 6:
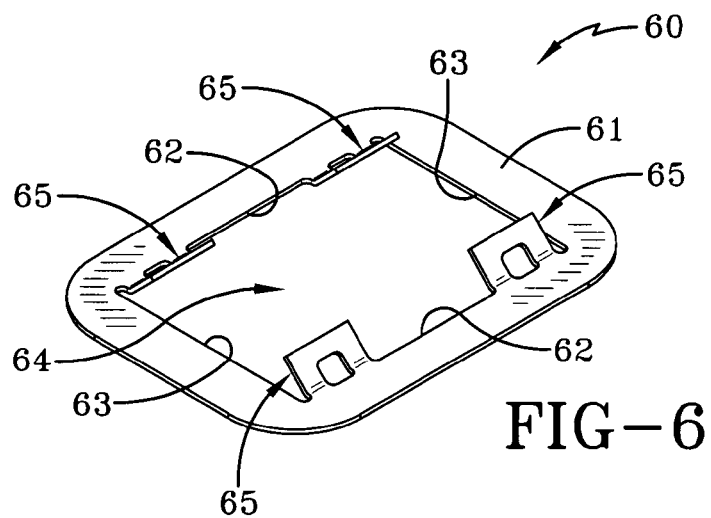
FIG. 6 is a perspective view of a retainer clip made in accordance with the present invention.
Figure 7:
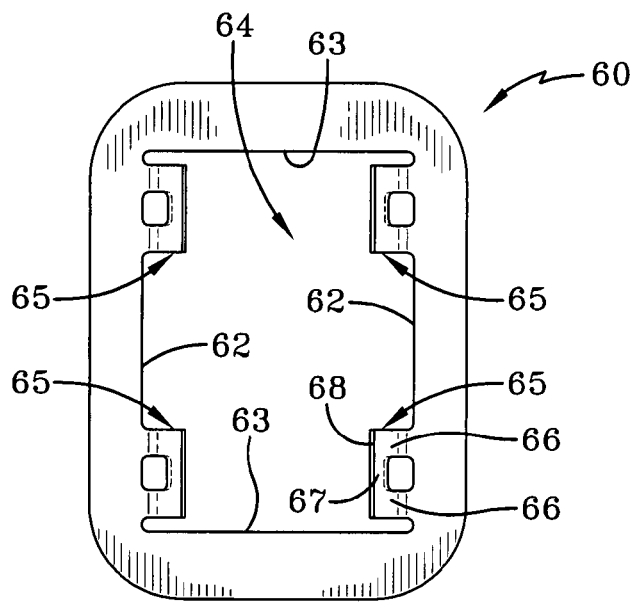
FIG. 7 is a top plan view of the retainer clip of FIG. 6.
Figure 8:
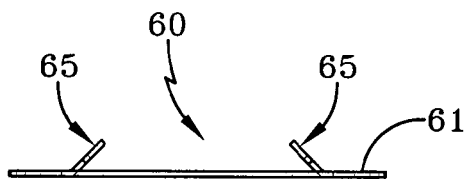
FIG. 8 is a front elevational view of the retainer clip of FIG. 6.

Retainer 60, shown in FIGS. 6, 7 and 8, includes an open, generally rectangular body 61 having an inner periphery defined by a pair of longitudinal edges 62 and a pair of lateral edges 63. Edges 62 and 63 define an aperture 64 which is adapted to receive insert 25 therethrough. The profile of aperture 64 generally matches that of insert 25, but is slightly larger to allow insert 25 to receive retainer 60 thereon. A plurality of tabs generally indicated by the numeral 65 are provided which extend inwardly from longitudinal edges 62. In the present embodiment, two tabs 65 are provided on each longitudinal edge 62, although, it should be appreciated that more or less may be used. Tabs 65 are disposed at an angle relative to body 61. In one or more embodiments, tabs 65 are disposed at about 45 degrees from body 61. Each tab 65 may include a pair of flattened legs 66 which are spaced and extend at an angle from longitudinal edges 62 and terminate at a contact wall 67. Contact wall 67 interconnects legs 66 and includes a contact edge 68. Contact edge 68 is adapted to engage ribs 33 as will be hereinafter described.

During assembly, visor support 10 is inserted into a headliner hole 26, and the retainer 60 may be slid downwardly over insert 25. As is evident from FIGS. 3 and 4, as assembled, retainer 60 is oriented so that tabs 65 are angled upwardly. Further, tabs 65 are each aligned with a rib 33 provided on side walls 29. As previously described, aperture 64 is sized to allow retainer 60 to easily fit over insert 25. Tabs 65 are sized so that contact edge 68 engages rib 33 as retainer 60 is slid downwardly over insert 25. Because the angle of tab 65 is acute in the direction of travel, each contact edge 68 slides relatively easily along rib 33. Retainer 60 is pressed downwardly until body 61 engages headliner 13 and retains it against headliner mount surface 12. The visor support 10 is made of a plastic material and thus is somewhat malleable. Retainer 60 may be formed of a harder material, preferably metal. Thus, when contact edge 68 engages rib 33, it tends to dig into rib 33. That is, contact edge 68 will tend to deform rib 33. Therefore, once retainer 60 is secured against headliner 13, tabs 65 prevent upward movement and effectively secures headliner 13 between retainer 60 and headliner mount surface 12. Because the tabs 65 are at an obtuse angle to the upward direction, contact edge 68 will tend to dig further into rib 33 if upward force is applied, thereby preventing upward movement. Thereafter, headliner support 10, headliner 13 and clip 40 may be secured to the vehicle frame as disclosed above.

Thus, when retainer 60 is used, the headliner 13 is held flush against headliner mount surface 12. Even if insert 25 is too long, or the vehicle body recess is too short, retainer 60 prevents unwanted headliner separation from visor support 10.

Thus, it can be seen that the objects of the invention have been satisfied by the structure and its method for use presented above. While only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A visor support assembly mountable to a vehicle having a headliner and adapted to secure a portion of a sun-visor, the support assembly comprising a support adapted to securely receive the portion of the sun-visor, said support including a surface which engages the headliner and an insert which projects through a hole in the headliner and a retainer including a generally flat body, an aperture sized to fit around said insert, and a plurality of tabs extending inwardly from said body; wherein said tabs engage said insert holding the headliner securely between said surface and said retainer body.

2. A visor support assembly according to claim 1, wherein said tabs are disposed at an angle relative to said body.

3. A visor support assembly according to claim 2, wherein said angle is about 45 degrees.

4. A visor support assembly according to claim 2, wherein said tab angles upwardly, away from the headliner.

5. A visor support assembly according to claim 1, wherein said body includes a pair of longitudinal edges which face said aperture, each said tab includes at least one flattened leg extending from said longitudinal edge and terminating at a contact wall.

6. A visor support assembly according to claim 5, wherein said contact wall includes a contact edge facing said insert, said contact edge engaging said insert to maintain said retainer in engagement with the headliner.

7. A visor support assembly according to claim 1, wherein said insert includes a plurality of upwardly extending ribs, said tabs engaging said ribs to maintain said retainer in engagement with the headliner.

8. A visor support assembly according to claim 7, wherein said ribs are made of a deformable material and said tabs include a metal material, said tabs permanently deforming said ribs thereby preventing upward retainer movement.

9. An interior support assembly adapted to extend through a vehicle headliner and mount to a vehicle frame, the support assembly comprising a support including a surface coplanar with, and adapted to lie flush with, the headliner, an insert extending upwardly from said surface and having a smaller circumference than said surface, said insert being received through a hold in the headliner and including a plurality of ribs which include a deformable material, and a retainer having an aperture to receive said insert and a plurality of tabs that project inwardly toward said aperture, said tabs including a material which is relatively harder than said ribs, wherein said headliner is secured between said surface and said retainer.

10. An interior support assembly according to claim 9, wherein said tabs are disposed at an angle relative to said ribs, said angle being about 45 degrees.

11. An interior support assembly according to claim 10, wherein said deformable material being plastic and said tab material being metal.

12. An interior support assembly according to claim 10, wherein said ribs include a sloped portion proximate to the top end of said ribs.

13. An interior support assembly adapted to extend through a vehicle headliner and mount to a vehicle frame, the support assembly comprising a support including a surface coplanar with, and adapted to lie flush with, the headliner, an insert extending upwardly from said surface and having a smaller circumference than said surface, said insert being received through a hole in the headliner, and a retainer having a rectangular body and an aperture to receive said insert defined by a pair of longitudinal edges and a pair of lateral edges, said retainer including a plurality of tabs that project inwardly toward said aperture from said longitudinal edges, wherein said headliner is secured between said surface and said retainer.

14. An interior support assembly adapted to extend through a vehicle headliner and mount to a vehicle frame, the support assembly comprising a support including a surface coplanar with, and adapted to lie flush with, the headliner, an insert extending upwardly from said surface and having a smaller circumference than said surface, said insert being received through a hole in the headliner, and a retainer having an aperture to receive said insert and a plurality of tabs that project inwardly toward said aperture, said tabs including a pair of flattened legs which are joined by, and terminate at, a contact wall, wherein said headliner is secured between said surface and said retainer.

15. A method of securing a support to a headliner comprising the steps of: providing a support including an exterior wall adapted to carry an object within a vehicle interior, an insert adapted to extend through a hole in the headliner and a surface generally coplanar to the headliner; inserting the insert into the hole in the headliner; and pressing a retainer having tabs onto the insert thereby engaging the insert with the tabs and securing the headliner between said surface and said retainer.

16. A method according to claim 15, wherein the insert includes a plurality of ribs and further comprising the step of engaging the tabs with the ribs.

17. A method according to claim 16, wherein the ribs include a deformable material and the tabs including a metal material, and further comprising the step of permanently deforming the ribs when the retainer is pressed onto the insert.

* * * * *